US012397347B2

(12) United States Patent
Fujimori et al.

(10) Patent No.: US 12,397,347 B2
(45) Date of Patent: Aug. 26, 2025

(54) METHOD FOR MANUFACTURING R-T-B BASED SINTERED MAGNET, AND R-T-B BASED SINTERED MAGNET

(71) Applicant: PROTERIAL, LTD., Tokyo (JP)

(72) Inventors: Nobuhiko Fujimori, Tokyo (JP); Tohru Obata, Yabu (JP); Kazuhiro Sonoda, Yabu (JP); Futoshi Kuniyoshi, Tokyo (JP); Daisuke Furusawa, Tokyo (JP); Tomohito Maki, Tokyo (JP); Shuji Mino, Tokyo (JP); Kouta Saitou, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 583 days.

(21) Appl. No.: 17/788,325

(22) PCT Filed: Dec. 24, 2020

(86) PCT No.: PCT/JP2020/048486
§ 371 (c)(1),
(2) Date: Jun. 23, 2022

(87) PCT Pub. No.: WO2021/132476
PCT Pub. Date: Jul. 1, 2021

(65) Prior Publication Data

US 2023/0040720 A1 Feb. 9, 2023

(30) Foreign Application Priority Data

Dec. 26, 2019 (JP) ................................ 2019-235578
Sep. 24, 2020 (JP) ................................ 2020-159614

(51) Int. Cl.
*B22F 3/00* (2021.01)
*B22F 1/00* (2022.01)
(Continued)

(52) U.S. Cl.
CPC .................. *B22F 3/00* (2013.01); *B22F 1/00* (2013.01); *C22C 38/005* (2013.01);
(Continued)

(58) Field of Classification Search
CPC ...... B22F 3/00; B22F 1/00; B22F 1/05; B22F 2009/044; B22F 2998/10; B22F 2999/00;
(Continued)

(56) References Cited

U.S. PATENT DOCUMENTS

| | | | |
|---|---|---|---|
| 5,858,123 | A | 1/1999 | Uchida et al. |
| 2012/0153759 | A1 | 6/2012 | Kawashita et al. |

(Continued)

FOREIGN PATENT DOCUMENTS

| | | | |
|---|---|---|---|
| EP | 0 753 867 | A1 | 1/1997 |
| JP | 04-287304 | A | 10/1992 |

(Continued)

OTHER PUBLICATIONS

JPH1022154A: English machine translation cited and attached (Year: 1998).*

(Continued)

*Primary Examiner* — Adil A. Siddiqui
(74) *Attorney, Agent, or Firm* — Keating & Bennett, LLP

(57) ABSTRACT

A method for manufacturing an R-T-B based sintered magnet according the present disclosure comprises: a step for preparing a coarse ground powder which is made from an alloy for R-T-B based sintered magnets and which has an average particle size of 10-500 μm; a step for obtaining a fine powder having an average particle size of 2.0-4.5 μm, by feeding the coarse ground powder to a jet mill device that has a grinding chamber filled with inert gas and grinding the coarse ground powder; and a step for producing a sintered body of the fine powder, wherein the inert gas has been
(Continued)

humidified, and the oxygen content of the R-T-B based sintered magnet is 1000-3500 ppm by mass.

10 Claims, 1 Drawing Sheet

(51) Int. Cl.

| | |
|---|---|
| ***B22F 1/05*** | (2022.01) |
| ***C22C 38/00*** | (2006.01) |
| ***H01F 1/057*** | (2006.01) |
| ***H01F 41/02*** | (2006.01) |

(52) U.S. Cl.
CPC ....... *H01F 1/0577* (2013.01); *H01F 41/0266* (2013.01); *H01F 41/0293* (2013.01); *B22F 1/05* (2022.01)

(58) Field of Classification Search
CPC .......... B22F 3/24; B22F 3/02; B22F 2202/05; B22F 9/04; B22F 3/10; B22F 2003/241; B22F 2003/248; C22C 38/005; H01F 1/0577; H01F 41/0266; H01F 41/0293
See application file for complete search history.

(56) References Cited

U.S. PATENT DOCUMENTS

| | | | | |
|---|---|---|---|---|
| 2015/0340136 | A1* | 11/2015 | Nagata | H01F 41/0293 148/101 |
| 2019/0096550 | A1* | 3/2019 | Kuniyoshi | H01F 41/0293 |

FOREIGN PATENT DOCUMENTS

| | | | | | |
|---|---|---|---|---|---|
| JP | 06-140220 | A | | 5/1994 | |
| JP | 08-148317 | A | | 6/1996 | |
| JP | 10-22154 | A | | 1/1998 | |
| JP | H1022154 | A | * | 1/1998 | B22F 1/00 |
| JP | 2006-100847 | A | | 4/2006 | |
| JP | 2011-060975 | A | | 3/2011 | |
| JP | 2012-158792 | A | | 8/2012 | |
| JP | 2018-142641 | A | | 9/2018 | |
| JP | 2019-169506 | A | | 10/2019 | |

OTHER PUBLICATIONS

Official Communication issued in International Patent Application No. PCT/JP2020/048486, mailed on Feb. 16, 2021.

* cited by examiner

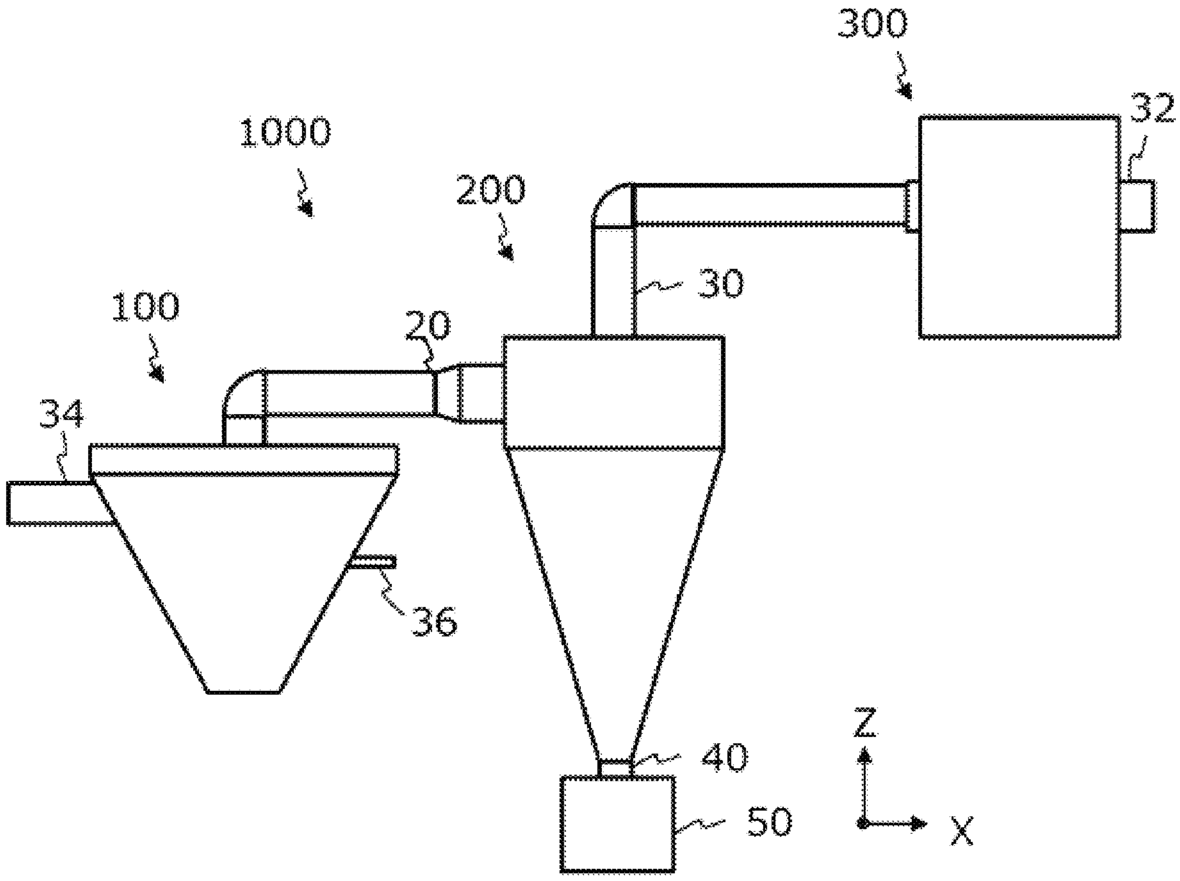
300
32
1000
200
30
100
20
34
36
40
50
Z
X

METHOD FOR MANUFACTURING R-T-B BASED SINTERED MAGNET, AND R-T-B BASED SINTERED MAGNET

TECHNICAL FIELD

The present application relates to a method for producing a sintered R-T-B based magnet, and a sintered R-T-B based magnet.

BACKGROUND ART

Sintered R-T-B based magnets (where R is a rare-earth element and contains at least one selected from the group consisting of Nd, Pr and Ce with no exception; T is at least one transition metal and contains Fe with no exception; and B is boron) each include a main phase formed of a compound having an $R_2Fe_{14}B$-type crystal structure, a grain boundary phase at grain boundaries of the main phase, and a compound phase generated by an influence of trace amount of elements incorporated thereto or impurities. The sintered R-T-B based magnets exhibit high remanence Br (hereinafter, may be referred to simply as "$B_r$") and high coercivity $H_{cJ}$ (hereinafter, may be referred to simply as "$H_{cJ}$") and have superb magnetic characteristics, and thus are known as high-performance magnets among permanent magnets. Therefore, the sintered R-T-B based magnets are used for various uses including various types of motors such as voice coil motors (VCM) of hard disc drives, motors for electric vehicles (EV, HV, PHV, etc.) and motors for industrial equipment, home appliance products, and the like.

Such a sintered R-T-B based magnet is produced by, for example, a method including a step of preparing an alloy powder, a step of pressing the alloy powder to form a powder compact, and a step of sintering the powder compact. The alloy powder is produced by, for example, the following method.

First, an alloy is produced from various types of molten metal materials as raw materials by a method such as an ingot method, a strip casting method or the like. The obtained alloy is processed by a pulverization step to obtain an alloy powder having a predetermined particle size distribution. The pulverization step usually includes a coarse-pulverization step and a fine-pulverization step. The former is performed by use of, for example, the hydrogen embrittlement phenomenon, whereas the latter is performed by use of, for example, a jet mill.

The alloy powder obtained by such a pulverization step is subjected to solid-gas separation performed by, for example, a cyclone collection device, and the alloy powder for the sintered R-T-B based magnet is recovered (collected).

The sintered R-T-B based magnets are demanded to be higher in performance and lower in cost. The performance may be improved by, for example, a finer texture, a lower content of oxygen or the like. The cost may be decreased by, for example, an improved pulverization efficiency or the like. Patent Document 1 discloses a method for improving the pulverization efficiency, which is to use a humidified inert gas stream having a dew point of −20° C. to 0° C. to perform pulverization by use of a jet mill. Patent Document 2 discloses a similar technique.

CITATION LIST

Patent Literature

Patent Document 1: Japanese Laid-Open Patent Publication No. Hei 8-148317

Patent Document 2: Japanese Laid-Open Patent Publication No. Hei 6-140220

SUMMARY OF INVENTION

Technical Problem

In the case where a sintered R-T-B based magnet including, as a main phase, an $R_2T_{14}B$ phase having a decreased content of oxygen, for example, containing oxygen at a content that is not higher than 3500 ppm by mass is to be produced, highly pure nitrogen gas, for example, is used as the inert gas in order to prevent powder particles from being oxidized in the pulverization step.

Studies made by the present inventors have found out that in the case where the pulverization is performed by use of a jet mill in inert gas such as the highly pure nitrogen gas or the like, use of a low oxygen content may inhibit achievement of the intended high level of performance. The size of powder particles may be reduced in an attempt to improve the performance, but such reduction size sacrifices the pulverization efficiency. The technique disclosed in Patent Document 1 or 2 may be used to improve the pulverization efficiency. However, the technologies disclosed in Patent Documents 1 and 2 are both for increasing the oxygen content to a very high level exceeding 4500 ppm in order to suppress the reactivity. These technologies cannot be used to improve the performance at a low oxygen content. Embodiments of the present disclosure provide a method for producing a sintered R-T-B based magnet capable of solving these problems and a sintered R-T-B based magnet produced by the same.

Solution to Problem

In a non-limiting and illustrative embodiment, a method for producing a sintered R-T-B based magnet (R is a rare-earth element and contains at least one selected from the group consisting of Nd, Pr and Ce with no exception, and T is at least one transition metal and contains Fe with no exception) according to the present disclosure includes the steps of preparing a coarse-pulverized powder of an alloy for the sintered R-T-B based magnet, the coarse-pulverized powder having an average particle size not shorter than 10 μm and not longer than 500 μm; supplying the coarse-pulverized powder to a jet mill machine including a pulverization chamber filled with inert gas and pulverizing the coarse-pulverized powder to obtain a fine-pulverized powder having an average particle size not shorter than 2.0 μm and not longer than 4.5 μm; and forming a sintered body of the fine-pulverized powder. The inert gas is in a humidified state, and the sintered R-T-B based magnet contains oxygen at a content not lower than 1000 ppm by mass and not higher than 3500 ppm by mass.

In an embodiment, the sintered R-T-B based magnet contains R at a content not higher than 31% by mass.

In an embodiment, the inert gas is nitrogen gas.

In an embodiment, the method further includes a diffusion step of diffusing a heavy rare-earth element RH (RH is at least one of Tb, Dy and Ho) from a surface to an interior of the sintered body.

In an embodiment, the step of forming the sintered body of the fine-pulverized powder includes the steps of forming a powder compact of the fine-pulverized powder by magnetic field wet press, or magnetic field press in an inert gas atmosphere, and sintering the powder compact.

In an embodiment, in the step performed to obtain the fine-pulverized powder, the fine-pulverized powder has an average particle size not shorter than 2.0 μm and not longer than 3.5 μm.

In a non-limiting and illustrative embodiment, in a sintered R-T-B based magnet (R is a rare-earth element and contains at least one selected from the group consisting of Nd, Pr and Ce with no exception, and T is at least one transition metal and contains Fe with no exception) according to the present disclosure, an $R_2T_{14}B$ phase as a main phase of the sintered R-T-B based magnet has an average crystal grain size not shorter than 3 μm and not longer than 7 μm. The sintered R-T-B based magnet contains oxygen, carbon and nitrogen. The sintered R-T-B based magnet contains oxygen at a content not lower than 1000 ppm by mass and not higher than 3500 ppm by mass. The sintered R-T-B based magnet contains carbon at a content not lower than 80 ppm by mass and not higher than 1500 ppm by mass. The sintered R-T-B based magnet contains nitrogen at a content not lower than 50 ppm by mass and not higher than 600 ppm by mass. Where the content of oxygen by mass is [O], the content of carbon by mass is [C] and the content of nitrogen by mass is [N], the sintered R-T-B based magnet satisfies the following expressions 1 through 3: expression 1: $[O]>[C]>[N]$; expression 2: $[O]\geq 1.5\times[N]$; and expression 3: $[C]\geq 1.5\times[N]$.

In a non-limiting and illustrative embodiment, a sintered R-T-B based magnet (R is a rare-earth element and contains at least one selected from the group consisting of Nd, Pr and Ce with no exception, and T is at least one transition metal and contains Fe with no exception) according to the present disclosure includes a main phase formed of an $R_2T_{14}B$ compound; and a boundary phase at boundaries of the main phase. An $R_2T_{14}B$ phase as a main phase of the sintered R-T-B based magnet has an average crystal grain size not shorter than 3 μm and not longer than 7 μm, and the sintered R-T-B based magnet contains oxygen, carbon and nitrogen. The sintered R-T-B based magnet contains oxygen at a content not lower than 1000 ppm by mass and not higher than 3500 ppm by mass. The sintered R-T-B based magnet contains nitrogen at a content not lower than 50 ppm by mass and not higher than 600 ppm by mass. The boundary phase includes a rare-earth oxide phase. The rare-earth oxide phase includes a rare-earth oxide nitride phase having an NaCl-type crystal structure. Where the content of 0 (% by atom) of the rare-earth oxide nitride phase is $\{O\}$ and the content of N (% by atom) of the rare-earth oxide nitride phase is $\{N\}$, the relationship of $\{O\}>1.8\times\{N\}$ is satisfied.

In an embodiment, where the content of C (% by atom) of the rare-earth oxide nitride phase is $\{C\}$, the relationship of $\{C\}>\{N\}\times 0.5$ is satisfied.

In an embodiment, a ratio of an area size of the rare-earth oxide nitride phase with respect to an area size of the rare-earth oxide phase is not lower than 50%.

In an embodiment, the sintered R-T-B based magnet includes a portion where at least one of a concentration of Tb and a concentration of Dy is gradually decreased from a surface to an interior of the magnet.

Advantageous Effects of Invention

According to embodiments of the present disclosure, a particle surface of a fine-pulverized powder obtained by pulverization performed by use of a jet mill is appropriately improved in quality by humidified inert gas. This realizes a sintered R-T-B based magnet having superb magnetic characteristics as a final product while the efficiency of pulverization by the jet mill is prevented from being decreased although the particle size of the fine-pulverized powder to be obtained by the pulverization is decreased.

BRIEF DESCRIPTION OF DRAWINGS

FIG. 1 schematically shows an example of structure of a sintered R-T-B based magnet alloy pulverization system 1000 according to an embodiment of the present disclosure.

DESCRIPTION OF EMBODIMENTS

As a result of studies, the present inventors have found out the following: in the case where a sintered R-T-B based magnet having a decreased content of oxygen is to be produced, reduction in the size of powder particles in the pulverization step deteriorates (nitrides) the powder particles due to inert gas used in the pulverization step (especially in the case where dry nitrogen gas is used as the inert gas), in addition to decreasing the pulverization efficiency; and thus a desired effect of improving the magnetic characteristics intended by the reduction in the size of the powder particles is not obtained. As a result of further studies, the present inventors have found out that use of humidified inert gas alleviates the deterioration of the powder particles caused by the inert gas. A conceivable reason for this is the following: an oxide film formed on surfaces of the powder particles prevents the inert gas (especially, nitrogen gas) from being introduced into the interior of the powder particles, and thus the deterioration (nitriding) of the powder particles caused by the inert gas is suppressed. It is conventionally known that the reduction in the size of the powder particles in the pulverization step decreases the pulverization efficiency and that such deterioration is alleviated by use of a humidified inert gas stream (e.g., Patent Documents 1 and 2). Naturally, however, pulverization performed by use of the humidified inert gas stream oxidizes the powder particles and thus deteriorates the magnetic characteristics. Therefore, in the case where a sintered R-T-B based magnet having the oxygen content thereof decreased in order to improve the magnetic characteristics is to be produced, a humidified inert gas stream is not positively used for the purpose of decreasing the size of the powder particles (for example, in Patent Document 1, the fine-pulverized powder has relatively high oxygen contents of 4500 ppm by mass and 4900 ppm by mass, and Patent Document 2 includes no description on the oxygen content). The present inventors accumulated studies based on the above-described knowledge that the deterioration of the powder particles caused by the inert gas would be alleviated by use of humidified inert gas, and as a result, obtained the following surprising results: in the case where the powder particles are pulverized while being humidified such that the sintered R-T-B based magnet to be obtained as a final product will have a lower oxygen content in a specific range, both of the deterioration (nitriding) of the powder particles and the deterioration of the magnetic characteristics caused by the oxidation due to the humidification are suppressed. Usually, a post-pulverization step in which the amount of oxygen in the sintered R-T-B based magnet is increased is mainly the step of pressing and sintering the fine-pulverized powder to obtain a sintered body. However, the oxygen content of the sintered R-T-B based magnet is not increased much in this step (e.g., not lower than 50 ppm by mass and not higher than 300 ppm by mass). Therefore, it is possible to adjust the oxygen content of the sintered R-T-B based magnet by the pulverization step. Namely, the present disclosure is on the following finding: the powder particles are pulverized while being humidified in the pulverization step such that the sintered R-T-B based magnet to be obtained will have an oxygen content in a specific range (not lower than 1000 ppm and not higher than 3500 ppm, preferably not lower than 1000 ppm and not higher than 3200 ppm) to decrease the size of the powder particles (the average particle size: not shorter than 2.0 μm and not longer than 4.5 μm, preferably not shorter than 2.0 μm and not longer than 3.5 μm); and as a result, the ease of pulverization is improved, and the deterioration of the magnetic characteristics caused by the oxidation or the nitriding in the pulverization step is alleviated, so that the obtained sintered R-T-B based magnet has high magnetic characteristics. The sintered R-T-B based magnet obtained in this manner includes, as a main phase, an $R_2T_{14}B$ phase having an average crystal grain size that is not shorter than 3 μm and not longer than 7 μm; contains oxygen, carbon and nitrogen; contains oxygen at a content that is not lower than 1000 ppm by mass and not higher than 3500 ppm by mass; contains carbon at a content that is not lower than 80 ppm by mass and not higher than 1500 ppm by mass; contains nitrogen at a content that is not lower than 50 ppm by mass and not higher than 600 ppm by mass; and satisfies the following expressions 1 through 3 where the oxygen content by mass is [O], the carbon content by mass is [C] and the nitrogen content by mass is [N]: expression 1: [O]>[C]>[N]; expression 2: [O]≥1.5×[N]; and expression 3: [C]≥1.5×[N].

<Method for Producing a Sintered R-T-B Based Magnet>

Hereinafter, an embodiment of a method for producing a sintered R-T-B based magnet according to the present disclosure will be described.

The present disclosure relates to a method for producing a sintered R-T-B based magnet. R is a rare-earth element and contains at least one selected from the group consisting of Nd, Pr and Ce with no exception. T is at least one transition metal and contains Fe with no exception.

The method for producing the sintered R-T-B based magnet includes:

(1) step of preparing a coarse-pulverized powder of an alloy for the sintered R-T-B based magnet, the coarse-pulverized powder having an average particle size that is not shorter than 10 μm and not longer than 500 μm;

(2) step of supplying the coarse-pulverized powder to a jet mill machine including a pulverization chamber filled with inert gas and pulverizing the coarse-pulverized powder to obtain a fine-pulverized powder having an average particle size that is not shorter than 2.0 μm and not longer than 4.5 μm; and (3) step of forming a sintered body of the fine-pulverized powder. The inert gas is in a humidified state. The average particle size (d50) may be measured by an airflow-dispersion laser diffraction method.

<Sintered R-T-B Based Magnet>

The sintered R-T-B based magnet according to the present disclosure has an oxygen content that is not lower than 1000 ppm by mass and not higher than 3500 ppm by mass. In step (2) perform to obtain the fine-pulverized powder, if the inert gas is not sufficiently humidified, the deterioration (nitriding) of the powder particles may be progressed by the inert gas, which may deteriorate the magnetic characteristics. Also in step (2), the humidification may progressively oxidize the powder particles, which may deteriorate the magnetic characteristics. In the case where the oxygen content is set to a level not lower than 1000 ppm and not higher than 3500 ppm, such deterioration of the magnetic characteristics is suppressed. In order to obtain higher magnetic characteristics, the sintered R-T-B based magnet has an oxygen content that is preferably not lower than 1000 ppm and not higher than 3200 ppm, more preferably not lower than 1000 ppm and not higher than 2400 ppm, and still more preferably not lower than 1300 ppm and not higher than 2400 ppm. In the case where the oxygen content of the sintered R-T-B based magnet is in the range of the present disclosure (not lower than 1000 pm and not higher than 3500 ppm), the fine-pulverized powder obtained by the pulverization with humidification exhibits improved compressibility at the time of pressing as shown in the examples described below. Such higher compressibility allows the pressing to be performed at a lower pressure. This suppresses the compact from being cracked. In addition, such high compressibility decreases a load on the die and improves the ease of continuous pressing, and also decreases the frequency of repair of the die and improves the production efficiency. Preferably, the oxygen content of the sintered R-T-B based magnet is not lower than 2000 ppm. With such a range of oxygen content, the ease of pressing is further improved. In consideration of the ease of pressing and the magnetic characteristics ($B_r$ and $H_{cJ}$), the oxygen content of the sintered R-T-B based magnet is preferably not lower than 2000 ppm and not higher than 2400 ppm.

Hereinafter, preferred compositions of the sintered R-T-B based magnet will be described.

R is a rare-earth element and contains at least one selected from the group consisting of Nd, Pr and Ce with no exception. Preferably, a combination of rare-earth elements represented by Nd—Dy, Nd—Tb, Nd—Dy—Tb, Nd—Pr—Dy, Nd—Pr—Tb, or Nd—Pr—Dy—Tb is used.

Among the elements contained in R, Dy and Tb are specifically effective to improve the $H_{cJ}$. In addition to the above-listed elements, La or any other rare-earth element is usable. Alternatively, misch metal or didymium may be used. R does not need to be a pure element, and may contain impurities unavoidably mixed during the production, in an amount of an industrially permissible range. R is contained at a content of, for example, not lower than 27% by mass and not higher than 35% by mass. The R content of the sintered R-T-B based magnet is preferably not higher than 31% by mass (not lower than 27% by mass and not higher than 31% by mass, preferably not lower than 29% by mass and not higher than 31% by mass). The R content of the sintered R-T-B based magnet is set to a level that is not higher than 31% by mass and the oxygen content thereof is set to a level that is not lower than 1000 ppm by mass and not higher than 3500 ppm by mass, so that the generation of R oxidized by being humidified is alleviated during the pulverization with humidification. Therefore, higher magnetic characteristics are obtained.

T contains iron (a case where T is substantially formed of iron is encompassed), and at most 50% by mass of the iron may be replaced with cobalt (Co) (a case where T is substantially formed of iron and cobalt is encompassed). Co is effective to improve the temperature characteristics and the corrosion resistance. The alloy powder may contain cobalt at a content that is not higher than 10% by mass. A content of T may be a part other than R and B, or a part other than R, B and M described below.

A content of B may be a known content, and is preferably, for example, 0.9% by mass to 1.2% by mass. If the B content is lower than 0.9% by mass, high $H_{cJ}$ may not be obtained. If the B content is higher than 1.2% by mass, the $B_r$ may be decreased. A part of B may be replaced with C (carbon). The B content is more preferably not higher than 1.0% by mass, and still more preferably not higher than 0.96% by mass.

In addition to the above-listed elements, an M element may be incorporated in order to improve the $H_{cJ}$. The M element is at least one selected from the group consisting of Al, Si, Ti, V, Cr, Mn, Ni, Cu, Zn, Ga, Zr, Nb, Mo, In, Sn, Hf, Ta and W. A content of the M element is preferably not higher than 5.0% by mass. A reason for this is that if the M content is higher than 5.0% by mass, the $B_r$ may be decreased. Unavoidable impurities may be contained.

The N (nitrogen) content of the sintered R-T-B based magnet is preferably not lower than 50 ppm by mass and not higher than 600 ppm by mass. The pulverization with humidification is performed such that the N (nitrogen) content will not be lower than 50 ppm by mass and not higher than 600 ppm by mass, so that the deterioration of the magnetic characteristics caused by the nitriding is suppressed while the ease of pulverization is improved. The nitrogen content is more preferably not lower than 50 ppm and not higher than 400 ppm, and most preferably not lower than 100 ppm and not higher than 300 ppm. With such a range of nitrogen content, the deterioration of the magnetic characteristics caused by the nitriding is suppressed while the ease of pulverization is further improved. The C (carbon) content of the sintered R-T-B based magnet is preferably not lower than 80 ppm by mass and not higher than 1500 ppm by mass, and more preferably not lower than 80 ppm by mass and not higher than 1000 ppm by mass. The lower limit of the C content may be 500 ppm or 800 ppm. Where the oxygen content by mass is [O], the carbon content by mass is [C] and the nitrogen content by mass is [N], it is preferred that the sintered R-T-B based magnet according to the present disclosure satisfies the following expressions 1 through 3: expression 1: [O]>[C]>[N]; expression 2: [O]≥1.5×[N]; and expression 3: [C]≥1.5×[N].

In the case where expressions 1 through 3 are satisfied, the obtained sintered R-T-B based magnet both improves the ease of pulverization with more certainty and suppresses the deterioration of the magnetic characteristics caused by the deterioration of the powder particles and by the oxidation due to the humidification. Being obtained by the pulverization with humidification performed as described above, the sintered R-T-B based magnet according to the present disclosure has the amount of oxygen increased, and specifically, has the nitriding caused by pulverization suppressed. As a result, the contents of oxygen, carbon and nitrogen in the obtained sintered R-T-B based magnet are as in expression 1 ([O]>[C]>[N]). In addition, the nitriding is sufficiently suppressed, and thus the nitrogen content is made smaller than the oxygen content and the carbon content, as in expression 2 ([O]≥1.5×[N]) and expression 3 ([C]≥1.5×[N]). Regarding expression 2, [O]≥3×[N] is more preferred, [O]≥5×[N] is still more preferred, and [O]≥10×[N] is most preferred. Regarding expression 3, [C]≥2×[N] is more preferred, and [C]≥5×[N] is most preferred.

The $R_2T_{14}B$ phase as the main phase of the sintered R-T-B based magnet according to the present disclosure has an average crystal grain size that is not shorter than 3.5 μm and not longer than 7.0 μm. The average crystal grain size may be obtained by the average number of crystal grains in the diameter of an approximating circle (at least 5000 grains) evaluated by EBSD (Electron BackScatter Diffraction).

<Example of Step (1) of Preparing a Coarse-Pulverized Powder of an Alloy for the Sintered R-T-B Based Magnet, the Coarse-Pulverized Powder Having an Average Particle Size that is not Shorter than 10 μm and not Longer than 500 μm>

The step of preparing a coarse-pulverized powder of an alloy for the sintered R-T-B based magnet, the coarse-pulverized powder having an average particle size that is not shorter than 10 μm and not longer than 500 μm, includes a step of preparing an alloy for the sintered R-T-B based magnet and a step of coarse-pulverizing the alloy by, for example, a hydrogen pulverization method or the like.

An example of method for producing an alloy for the sintered R-T-B based magnet will be described. A metal material or an alloy adjusted in advance so as to have the above-described composition is subjected to an ingot casting method, namely, is melted and put into a casting mold. As a result, an alloy ingot is obtained. Alternatively, a molten metal material or alloy may be subjected to a quenching method, for example, a strip casting method or a centrifugal casting method. As a result, an alloy flake is produced. In the case where the strip casting method or the centrifugal casting method is used, the molten metal material or alloy is put into contact with a monoaxial roll, a biaxial roll, a rotatable disc, a rotatable cylindrical casting mold or the like to be quenched, and as a result, a coagulated alloy thinner than the alloy produced by the ingot method is produced.

In this embodiment of the present disclosure, the alloy produced by either the ingot method or the quenching method is usable. It is preferred that the alloy is produced by the quenching method such as the strip casting method or the like. A quenched alloy produced by such a quenching method usually has a thickness in the range of 0.03 mm to 1 mm, and is flake-shaped. The molten alloy starts coagulating from a surface that is in contact with the cooling roll (roll contact surface), and crystal grows like columns in a thickness direction from the roll contact surface. The quenched alloy is cooled in a shorter time than an alloy (ingot alloy) produced by the conventional ingot casting method (mold casting method), and therefore, includes a finer texture, has a shorter crystal grain size, and a larger area size of grain boundaries. An R-rich phase expands broadly in the grain boundaries. Therefore, the R-rich phase in the alloy produced by the quenching method is highly dispersed. For this reason, the alloy is easily broken at the grain boundaries by the hydrogen pulverization method. In the case where the quenched alloy is pulverized by the hydrogen pulverization method, the particle size of the hydrogen-pulverized powder (coarse-pulverized powder) is, for example, 1.0 mm or shorter. The coarse-pulverized powder thus obtained is pulverized by a jet mill in a humidified atmosphere (step (2)).

<Example of Step (2) of Supplying the Coarse-Pulverized Powder to a Jet Mill Machine Including a Pulverization Chamber Filled with Inert Gas and Pulverizing the Coarse-Pulverized Powder to Obtain a Fine-Pulverized Powder Having an Average Particle Size that is not Shorter than 2.0 μm and not Longer than 4.5 μm>

<Pulverization System>

First, a pulverization system usable for the method for producing the sintered R-T-B based magnet according to the present disclosure will be described with reference to FIG. 1. FIG. 1 schematically shows an example of structure of a pulverization system 1000 in this embodiment. In this embodiment, the sintered R-T-B based magnet alloy pulverization system 1000 includes a jet mill machine 100, a cyclone collection device 200, and a bag filter device 300.

The jet mill machine 100 receives a pulverization substance to be pulverized supplied from a raw material tank (not shown) via a raw material supply pipe 34. The pulverization substance is coarse-pulverized powder, having an average particle size that is not shorter than 10 μm and not longer than 500 μm, of an alloy for the sintered R-T-B based magnet. In the present disclosure, the average particle size (d50) may be measured by an airflow-dispersion laser diffraction method (conformed to JIS Z 8825:2013 revised edition). Namely, in this specification, the "average particle size" refers to a particle size (median diameter) at which the accumulated particle size distribution (volume-based) from the shorter-diameter side is 50%.

The average particle size (d50) in embodiments of the present disclosure refers to d50 measured by the particle size distribution measuring device "HELOS & RODOS" produced by Sympatec GmbH under the conditions of the dispersion pressure of 4 bar, the measurement range of R2, and the calculation mode of HRLD.

The raw material supply pipe 34 is provided with a plurality of valves, and the inner pressure of the jet mill machine 100 is maintained at an appropriate level by opening or closing the valves. Particles of the pulverization substance introduced into the jet mill machine 100 collide against each other or collide against an collision plate by inert gas injected at high speed from a nozzle tube 36. The collision plate is provided in order to efficiently pulverize the pulverization substance. The nozzle tube 36 is connected with a humidification tube provided to incorporate moisture into the inert gas.

The powder of the alloy for the sintered R-T-B based magnet is active and is easily oxidized. Therefore, gas used in the jet mill machine 100 is generally inert gas such as nitrogen, argon, helium or the like that is dry (highly pure) and has a dew point of −60° C. or lower. Such inert gas is used in order to avoid the risk of heat generation and ignition and also in order to decrease the content of oxygen as an impurity and thus to improve the performance of the magnet. By contrast, in the embodiments of the present disclosure, the pulverization is performed in a humidified state where moisture is intentionally introduced into the inert gas. This will be described in detail below.

The powder particles fine-pulverized inside the jet mill machine 100 (fine-pulverized powder) ride an updraft and are introduced into an inlet tube 20 of the cyclone collection device 200 from an outlet in an upper portion of the jet mill machine 100. Particles that have not been sufficiently pulverized and are still coarse are classified by a classification rotor provided to separate coarse particles having a median diameter (d50) or longer, and remain inside the jet mill machine 100 to be further pulverized by collision. The classification of the coarse particles may be performed by the classification rotor or by centrifugation using swirl. In this manner, the pulverization substance (coarse-pulverized powder) supplied to the jet mill machine 100 is pulverized into fine-pulverized powder having a particle size distribution of an average particle size (median diameter: d50) that is not shorter than 2.0 μm and not longer than 4.5 μm, and then moves to the cyclone collection device 200.

The cyclone collection device 200 is used to separate the powder from a gas stream that carries the powder. Specifically, the coarse-pulverized powder of the alloy for the sintered R-T-B based magnet is pulverized by the jet mill on the immediately previous stage, and the fine-pulverized powder generated by the pulverization is supplied to the cyclone collection device 200 via the inlet tube 20 together with the gas used for the pulverization. A mixture of the inert gas (pulverization gas) and the pulverized fine-pulverized powder is transferred into the cyclone collection device 200 as a high-speed gas stream. The cyclone collection device 200 is used to separate the pulverization gas and the fine-pulverized powder from each other. The fine-pulverized powder separated from the pulverization gas is recovered into a powder collector 50 via an outlet 40. The pulverization gas is supplied to the bag filter device 300 via an outlet tube 30. The bag filter device 300 recovers a very fine powder, and clean gas is released to outside via a gas outlet 32. Such solid-gas separation may be performed by a bag filter instead of the cyclone collection device 200. However, the use of the bag filter may have a significant influence on the environment and the safety due to, for example, the fine-pulverized powder being scattered in the air if the filter is broken. Alternatively, a bag filter may be further used to separate the fine-pulverized powder from the gas after the solid-gas separation is performed by the cyclone collection device 200.

According to the present disclosure, the pulverization with humidification is performed such that the oxygen content of the sintered R-T-B based magnet will be in the range that is not lower than 1000 ppm by mass and not higher than 3500 ppm by mass. As a result, the deterioration (nitriding) of the powder particles due to the pulverization and the oxidation by the humidification are both suppressed, and thus high magnetic characteristics are obtained. As described above, the oxygen content of the sintered R-T-B based magnet is not usually increased much (e.g., not lower than 50 ppm and not higher than 300 ppm) in the steps after the pulverization (mainly, in the step of forming a sintered body of the fine-pulverized powder). Therefore, it is possible to adjust the oxygen content of the sintered R-T-B based magnet by the pulverization step.

Specifically, the humidified inert gas to be used in step (2) is obtained by, for example, supplying the inert gas with moisture at a rate that is not lower than 0.5 g and not higher than 6.0 g per 1 kg of the coarse-pulverized powder. If the amount of moisture is smaller than 0.5 g, the deterioration (nitriding) of the powder particles caused by the pulverization may not be suppressed, and as a result, the magnetic characteristics may possibly be deteriorated. By contrast, if the amount of moisture is larger than 6.0 g, the inert gas is humidified too much, and as a result, the powder particles may be oxidized excessively and the magnetic characteristics may be deteriorated.

The dew point in the pulverization chamber or the amount of the coarse-pulverized powder to be supplied to the jet mill machine vary in accordance with the pulverization time or the size of the jet mill machine. In one preferred embodiment, the inert gas is humidified such that the dew point will be in the range that is not lower than −55° C. and not higher than −30° C. at the time of pulverization. In another preferred embodiment, the coarse-pulverized powder is supplied to the jet mill machine at a rate that is not lower than 35 kg/hour and not higher than 180 kg/hour.

Examples of usable inert gas include nitrogen, argon and helium. Among these types of gas, nitrogen is available at low cost in a highly pure state, and thus is most preferred. Therefore, in a preferred embodiment, the inert gas is nitrogen. However, the present inventors have found out the following as a result of studies: in the case where the conventional method is used to perform the pulverization by a jet mill by use of inert gas formed of nitrogen, when the average particle size of the obtained fine-pulverized powder is 4.5 μm or shorter, the magnetic characteristics start deteriorating due to the nitriding. It has been found out that especially when the average particle size is 3.5 μm or shorter, the deterioration of the magnetic characteristics due to the nitriding may be conspicuous. However, according to the embodiments of the present disclosure, the pulverization is performed in a humidified atmosphere properly adjusted.

Therefore, even though nitrogen is used as the inert gas, the nitriding and the oxidation are both suppressed. A conceivable reason for this is that even though the inert gas in the pulverization chamber is mainly formed of nitrogen, the inert gas is humidified so as to contain a specifically adjusted amount of moisture and therefore, oxidizes active surfaces of the particles appearing by the fine pulverization and forms thin oxide films thereon before nitriding the surfaces. The increase in the oxygen content of the sintered R-T-B based magnet occurring in the steps after the fine pulverization (mainly, in the step of forming a sintered body of the fine-pulverized powder) is preferably not lower than 50 ppm by mass and not higher than 300 ppm by mass, and more preferably not lower than 50 ppm by mass and not higher than 200 ppm by mass. In order to achieve such a level, magnetic field wet press or magnetic field press in an inert gas atmosphere is performed as described below, and the obtained compact is sintered. The average particle size of the fine-pulverized powder in the step performed to obtain the fine-pulverized powder is not shorter than 2.0 μm and not longer than 4.5 μm. If the average particle size is shorter than 2.0 μm, the particle size of the fine-pulverized powder may possibly be too short to suppress the decrease in the efficiency of the pulverization performed by the jet mill. If the average particle size is longer than 4.5 μm, high magnetic characteristics may possibly not be obtained. More preferably, the particle size of the fine-pulverized powder is not shorter than 2.0 μm and not longer than 3.5 μm. A shorter average particle size improves the magnetic characteristics.

<Example of Step (3) of Forming a Sintered Body of the Fine-Pulverized Powder>

In a preferred embodiment, the step of forming a sintered body of the fine-pulverized powder includes a step of forming a powder compact of the fine-pulverized powder by magnetic field press, and a step of sintering the powder compact. Regarding the magnetic field press, it is preferred to form the powder compact by press in an inert gas atmosphere or by wet press from the point of view of suppressing oxidation. Especially in the case where the wet press is used, surfaces of particles forming the powder compact are covered with a dispersant such as an oily material or the like, and thus are suppressed from contacting oxygen or water vapor in the air. Therefore, the particles are prevented or suppressed from being oxidized by the air before, during or after the pressing step.

In order to perform the magnetic field wet press, a slurry containing a dispersant mixed in the fine-pulverized powder is prepared and is supplied to a cavity of a die of a wet press device. Thus, the slurry is pressed in the magnetic field.

Dispersant

A dispersant is a liquid that forms a slurry by having an alloy powder dispersed therein.

A dispersant preferably usable for the present disclosure may be mineral oil or synthetic oil. There is no specific limitation on the type of the mineral oil or the synthetic oil. If the mineral oil or the synthetic oil has a kinetic viscosity larger than 10 cSt at room temperature, such an increased viscosity strengthens the binding force between the alloy powder particles and may have an adverse influence on the ease of alignment of the alloy powder during the magnetic field wet press. Therefore, the kinetic viscosity of the mineral oil or the synthetic oil at room temperature is preferably not higher than 10 cSt. If the mineral oil or the synthetic oil has a fractional distillation point higher than 400° C., it is difficult to deoil the obtained compact. As a result, the amount of carbon remaining in the sintered body may be increased to deteriorate the magnetic characteristics. Therefore, the fractional distillation point of the mineral oil or the synthetic oil is preferably not higher than 400° C. Vegetable oil may be used as the dispersant. The "vegetable oil" refers to oil extracted from vegetables, and there is no specific limitation on the type of vegetable.

Formation of the Slurry

The slurry is obtained by mixing the obtained alloy powder and the dispersant.

There is no specific limitation on the mixing ratio of the alloy powder and the dispersant. It is preferred that the slurry contains the alloy powder at a concentration that is not lower than 70% on the mass basis (i.e., not lower than 70% by mass). Reasons for this are that with such a concentration range, the alloy powder is supplied into the cavity efficiently at a flow rate of 20 to 600 $cm^3$/sec., and superb magnetic characteristics are obtained. Preferably, the concentration of the alloy powder in the slurry is not higher than 90% by mass. There is no specific limitation on the method of mixing the alloy powder and the dispersant. The alloy powder and the dispersant may be separately prepared and mixed with respective predetermined weights to form a slurry. Alternatively, the slurry may be formed as follows: in the process of dry-pulverizing the coarse-pulverized powder by a jet mill or the like to obtain the alloy powder, a container accommodating a dispersant is located at an alloy powder outlet of a pulverization machine such as a jet mill or the like, and the alloy powder obtained as a result of the pulverization is directly recovered into the dispersant in the container. In this case, it is preferred that the container has an atmosphere formed of nitrogen gas and/or argon gas, and that the obtained alloy powder is directly recovered into the dispersant without contacting the air to form a slurry. Still alternatively, the coarse-pulverized powder may be wet-pulverized by a vibration mill, a ball mill, an attritor or the like while being held in the dispersant to form a slurry formed of the alloy powder and the dispersant.

The slurry obtained in such a manner is pressed by a known wet pressing apparatus to obtain a compact having a predetermined size and a predetermined shape. The obtained compact is sintered to obtain a sintered body.

Sintering Step

Next, the compact is sintered to obtain a sintered rare-earth magnet (sintered body).

The compact is sintered at a pressure that is preferably not higher than 0.13 Pa ($10^{-3}$ Torr) and more preferably not higher than 0.07 Pa ($5.0\times10^{-4}$ Torr), and at a temperature in the range of 1000° C. to 1150° C. In order to prevent oxidation due to the sintering, the gas remaining in the atmosphere may be replaced with inert gas such as helium, argon or the like. It is preferred that the obtained sintered body is heat-treated. The heat treatment improves the magnetic characteristics. The conditions for the heat treatment, such as the heat treatment temperature, the heat treatment time and the like, may be known conditions. The sintered rare-earth magnet obtained in this manner is subjected to a grinding and/or polishing step, a surface treatment step, and a magnetization step as necessary, and as a result, a sintered rare-earth magnet is obtained as a final product.

In one preferred embodiment, the method for producing a sintered R-T-B based magnet according to the present disclosure further includes a diffusion step of diffusing a heavy rare-earth element RH (RH is at least one of Tb, Dy and Ho) from the surface to the interior of the sintered body. In the case where the heavy rare-earth element RH is diffused from the surface to the interior of the sintered body, the coercivity is efficiently improved. As shown in the examples described below, it has been found out that in the case where the diffusion step is performed on the sintered body obtained as a result of the pulverization with humidification according to the present disclosure, higher $H_{cJ}$ is obtained than in the case where the diffusion step is performed on a sintered body obtained as a result of the pulverization with no humidification. There is no specific limitation on the method of the diffusion step. Any known method is usable. Tb or Dy is preferred as the heavy rare-earth element RH. A sintered R-T-B based magnet containing such a heavy rare-earth element RH diffused therein includes a portion where at least one of a concentration of Tb and a concentration of Dy is gradually decreased from the surface to the interior of the magnet. Such a state where "the sintered R-T-B based magnet includes a portion where at least one of the concentration of Tb and the concentration of Dy is gradually decreased from the surface to the interior of the magnet" indicates that at least one of Tb and Dy is in a state diffused from the surface to the interior of the magnet. This state may be confirmed by, for example, a line analysis performed by Energy Dispersive X-ray Spectroscopy (EDX) on any cross-section of the sintered R-T-B based magnet, specifically, on a region from the surface to the vicinity of the center of the cross-section of the magnet.

The concentrations of Tb and Dy may vary in accordance with whether the site of measurement is in main phase crystal grains ($R_2T_{14}B$ compound grains) or at the grain boundaries, in the case where the site of measurement has, for example, a size on the submicron order. In the case where the site of measurement is at the grain boundaries, the concentration of Tb or Dy may vary locally or microscopically in accordance with the type or the distribution of a Tb- or Dy-containing compound that may be formed at the grain boundaries. In the case where Tb and Dy are diffused from the surface to the interior of the magnet, it is unequivocal that an average of concentration values measured, regarding each of these elements, at positions of an equal depth from the surface of the magnet is gradually decreased from the surface to the interior of the magnet. In the present disclosure, the sintered R-T-B based magnet is defined to include a portion where at least one of the Tb concentration and the Dy concentration is gradually decreased, as long as at least one of the average concentration value of Tb and the average concentration value of Dy is decreased as the depth is increased in at least a region from the surface to a depth of 200 μm of the sintered R-T-B based magnet. The average concentration values of Tb and Dy are each measured as a function with the depth being a parameter.

After the diffusion step of diffusing the heavy rare-earth element RH from the surface to the interior of the sintered body is performed, the sintered R-T-B based magnet is obtained as a final product. It is preferred that the sintered R-T-B based magnet has an R content that is not higher than 32% by mass (not lower than 27% by mass and not higher than 32% by mass). The R content of the sintered R-T-B based magnet is set to a level not higher than 32% by mass and the oxygen content thereof is set to a level not lower than 1000 ppm by mass and not higher than 3500 ppm by mass (preferably not lower than 1000 ppm and not higher than 3200 ppm, more preferably not lower than 1000 ppm and not higher than 2400 ppm, and still more preferably not lower than 2000 ppm and not higher than 2400 ppm). In this case, higher magnetic characteristics are obtained.

The N (nitrogen) content of the sintered R-T-B based magnet obtained as a final product after the diffusion step is preferably not lower than 50 ppm by mass and not higher than 600 ppm by mass, more preferably not lower than 50 ppm by mass and not higher than 400 ppm by mass, and most preferably not lower than 100 ppm by mass and not higher than 300 ppm by mass. The C (carbon) content of the sintered R-T-B based magnet is preferably not lower than 80 ppm by mass and not higher than 1500 ppm by mass, and more preferably not lower than 80 ppm by mass and not higher than 1000 ppm by mass. It is preferred that the sintered R-T-B based magnet obtained as a final product after the diffusion step satisfies the following expressions 1 through 3 where the oxygen content thereof is [O], the carbon content thereof is [C] and the nitrogen content thereof is [N]: expression 1: [O]>[C]>[N]; expression 2: [O]≥1.5×[N]; and expression 3: [C]≥1.5×[N].

The present inventors investigated the texture of the above-described sintered R-T-B based magnet obtained by pulverization with humidification according to the present disclosure in detail. As a result, the present inventors have found out that the grain boundary phase of the sintered R-T-B based magnet includes a rare-earth oxide phase and that the rare-earth oxide phase includes a rare-earth oxide nitride phase. It has also been found out that in the case where the rare-earth oxide nitride phase has a specific crystal structure and an oxygen content {O} and a nitrogen content {N} (% by atom) of the rare-earth oxide nitride phase satisfy a specific relationship, high magnetic characteristics are obtained. It has been found out that this effect is especially conspicuous in the case where the diffusion step of diffusing a heavy rare-earth element RH from the surface to the interior of the sintered body is performed (it has been found out that the effect of improving the Hou by the diffusion is high). Such a texture is preferably obtained by the pulverization with humidification according to the present disclosure, but the method is not limited to this. For example, a sintered R-T-B based magnet described below is obtained by adjusting the amount of oxygen or nitrogen to be introduced during the pulverization by a jet mill.

A sintered R-T-B based magnet (R is a rare-earth element and contains at least one selected from the group consisting of Nd, Pr and Ce with no exception, and T is at least one transition metal and contains Fe with no exception) according to the present disclosure includes a main phase formed of an $R_2T_{14}B$ compound; and a boundary phase at boundaries of the main phase. The $R_2T_{14}B$ phase as the main phase of the sintered R-T-B based magnet has an average crystal grain size not shorter than 3 μm and not longer than 7 μm, and the sintered R-T-B based magnet contains oxygen, carbon and nitrogen. The sintered R-T-B based magnet contains oxygen at a content not lower than 1000 ppm by mass and not higher than 3500 ppm by mass, and contains nitrogen at a content not lower than 50 ppm by mass and not higher than 600 ppm by mass. The boundary phase includes a rare-earth oxide phase. The rare-earth oxide phase includes a rare-earth oxide nitride phase having an NaCl-type crystal structure. Where the content of O (% by atom) of the rare-earth oxide nitride phase is {O} and the content of N (% by atom) of the rare-earth oxide nitride phase is {N}, the relationship of {O}>1.8×{N} is satisfied. Preferably, where the content of C (% by atom) of the rare-earth oxide nitride phase is {C}, the sintered R-T-B based magnet also satisfies the relationship of {C}>{N}×0.5.

A ratio of an area size of the rare-earth oxide nitride phase with respect to an area size of the rare-earth oxide phase is preferably not lower than 50%.

The average crystal grain size of the $R_2T_{14}B$ phase as the main phase of the sintered R-T-B based magnet is not shorter than 3 μm and not longer than 7 μm (preferably, not shorter than 3 μm and not longer than 5 μm). The sintered R-T-B based magnet contains oxygen, carbon and nitrogen. The oxygen content is not lower than 1000 ppm by mass and not higher than 3500 ppm by mass (preferably, not lower than 1000 ppm by mass and not higher than 2500 ppm by mass). The nitrogen content is not lower than 50 ppm by mass and not higher than 600 ppm by mass. With such a structure, high magnetic characteristics are obtained. The boundary phase of the sintered R-T-B based magnet includes a rare-earth oxide phase. The rare-earth oxide phase includes a rare-earth oxide nitride phase having an NaCl-type crystal structure. As a result of studies, the prevent inventors have found out that a rare-earth oxide nitride phase having an NaCl-type crystal structure is easily bonded with C (carbon). It has been found out that for this reason, the boundary phase including the rare-earth oxide nitride phase having an NaCl-type crystal structure decreases the amount of C of the main phase, which provides high magnetic characteristics. It has also been found out that a rare-earth oxide nitride phase having an NaCl-type crystal structure does not easily form an oxide together with a heavy rare-earth element (e.g., Tb or Dy). Therefore, in the case where the sintered R-T-B based magnet contains Tb or Dy, the boundary phase including a rare-earth oxide nitride phase having an NaCl-type crystal structure allows a larger amount of Tb or Dy to be contained in the main phase, which provides high magnetic characteristics. As shown in the examples described below, such an effect is especially conspicuous in the case where the diffusion step of diffusing a heavy rare-earth element RH from the surface to the interior of the sintered body is performed. Where the O content (% by atom) of the rare-earth oxide nitride phase is $\{O\}$ and the N content (% by atom) of the rare-earth oxide nitride phase is $\{N\}$, the rare-earth oxide nitride phase satisfies the relationship of $\{O\}>1.8\times\{N\}$. In the case where this relationship is satisfied, the nitriding of the sintered R-T-B based magnet is suppressed, and high magnetic characteristics are obtained. An NaCl-type rare-earth oxide nitride generates a nitride together with a heavy rare-earth element. Therefore, in the case where the sintered R-T-B based magnet contains Tb or Dy and furthermore, the rare-earth oxide nitride phase of an NaCl-type crystal structure included in the boundary phase has an O content and an N content satisfying the relationship of $\{O\}>1.8\times\{N\}$, the generation of a nitride by such a rare-earth oxide nitride phase and a heavy rare-earth element is suppressed, and a larger amount of Tb of Dy is allowed to be contained in the main phase. Therefore, high magnetic characteristics are obtained. As shown in the examples described below, such an effect is especially conspicuous in the case where the diffusion step of diffusing a heavy rare-earth element RH from the surface to the interior of the sintered body is performed.

Preferably, where the C content (% by atom) of the rare-earth oxide nitride phase is $\{C\}$, the relationship of $\{C\}>\{N\}\times0.5$ is satisfied. In this case, the amount of C of the main phase is decreased, and higher magnetic characteristics are obtained.

The ratio of the area size of the rare-earth oxide nitride phase with respect to the area size of the rare-earth oxide phase is preferably not lower than 50%. In the case where the area size of the rare-earth oxide nitride phase occupies at least 50% of the area size of the rare-earth oxide phase, the magnetic characteristics are further improved. The ratio of the area size of the rare-earth oxide nitride phase with respect to the area size of the rare-earth oxide phase is more preferably not lower than 70%, and still more preferably not lower than 90%.

Whether or not "the boundary phase of the sintered R-T-B based magnet includes a rare-earth oxide phase, and the rare-earth oxide phase includes a rare-earth oxide nitride phase having an NaCl-type crystal structure" may be checked by performing, for example, diffraction measurement by use of an x-ray, a neutron, an electron beam or the like and observing a diffraction peak or pattern specific to the NaCl-type crystal structure.

Whether or not "where the content of 0 (% by atom) of the rare-earth oxide nitride phase is $\{O\}$ and the content of N (% by atom) of the rare-earth oxide nitride phase is $\{N\}$, the rare-earth oxide nitride phase satisfies the relationship of $\{O\}>1.8\times\{N\}$" may be checked by performing a point, line or plane analysis of the oxide phase by, for example, EDX (Energy Dispersive X-ray Spectroscopy or WDX (Wavelength Dispersive X-ray Spectroscopy).

Whether or not "a ratio of an area size of the rare-earth oxide nitride phase with respect to an area size of the rare-earth oxide phase is not lower than 50%" may be checked as follows, for example: mapping is performed by EDX or WDX on a certain view field, the rare-earth oxide phase is colored with a different color from the rest of the view field by use of commercially available software, the rare-earth oxide nitride phase is colored with a different color from the rest of the rare-earth oxide phase, and then the number of pixels of the color of each of the phases is counted.

EXAMPLES

The present disclosure will be described in more detail by way of examples. The present disclosure is not limited to any of the following examples.

Example 1

Alloys for sintered R-T-B based magnets were formed by a strip casting method such that the sintered R-T-B based magnets would generally have the compositions shown in samples Nos. 1 through 13 in Table 1 (excluding O, C and N). The obtained alloys were each coarse-pulverized by a hydrogen pulverization method to obtain a coarse-pulverized powder. An average particle size of each coarse-pulverized powder was measured. The average particle sizes were in the range of 200 μm to 400 μm. In the present disclosure, the "average particle size" refers to a particle size (median diameter) at which the accumulated particle size distribution (volume-based) from the shorter-diameter side is 50%. The average particle sizes (d50) were measured by the particle size distribution measuring device "HELOS & RODOS" produced by Sympatec GmbH under the conditions of the dispersion pressure of 4 bar, the measurement range of R2, and the calculation mode of HRLD.

The above-obtained coarse-pulverized powder was supplied to the jet mill machine 100 shown in FIG. 1 and pulverized to obtain a fine-pulverized powder. Table 2 shows conditions for the pulverization. No. 2 in Table 2 was obtained as follows: moisture was supplied to inert gas at a rate of 1.5 g per 1 kg of the coarse-pulverized powder, and the coarse-pulverized powder was pulverized while being humidified. The amount of the coarse-pulverized powder supplied to the jet mill machine was 64.0 kg/h. No. 1 and Nos. 3 through 13 were obtained in a similar manner with different amounts. (For No. 1, the coarse-pulverized powder was pulverized with no humidification.) In this example, nitrogen gas was used as the inert gas. Table 2 shows the average particle size of each fine-pulverized powder obtained. The fine-pulverized powder was immersed in mineral oil having a fractional distillation point of 250° C.

and a kinetic viscosity at room temperature of 2 cSt in a nitrogen atmosphere to prepare a slurry. The slurry had a concentration of 85% by mass. The obtained slurry was pressed (wet-pressed) in a magnetic field to obtain a compact. Used as a pressing apparatus was a so-called orthogonal magnetic field pressing apparatus (transverse magnetic field pressing apparatus), in which the direction of magnetic field application was orthogonal to the pressurizing direction. The obtained compact was sintered at 1040° C. (a temperature at which a sufficiently dense texture would result through sintering was selected) for 4 hours in vacuum to obtain a sintered body. The sintered body had a density not lower than 7.5 Mg/cm$^3$. The sintered body was kept at 800° C. for 2 hours, and then was cooled down to room temperature. Next, the obtained sintered body was subjected to a heat treatment of being kept at 500° C. for 2 hours, and then was cooled down to room temperature. As a result, a sintered body (sintered R-T-B based magnet) was obtained. Components of the obtained sintered magnet were found. Contents of Nd, Pr, B, Co, Al, Cu, Ga and Zr were measured by Inductively Coupled Plasma Optical Emission Spectroscopy. The amounts of O (oxygen), N (nitrogen) and C (carbon) were measured by use of a gas analyzer, respectively by a gas fusion-infrared absorption method, a gas fusion-thermal conductivity method, and a combustion-infrared absorption method. The units of the contents of O, C and N are ppm by mass. The results are shown in Table 1. The sintered magnets were mechanically processed to form samples each having a length of 7 mm, a width of 7 mm and a thickness of 7 mm. The $B_r$ and the $H_{cJ}$ of each of the samples were measured by a B-H tracer. Results of the measurement are shown in Table 3. As shown in Table 1, the present invention examples all satisfy expressions 1 through 3 of the present disclosure. The average crystal grain size of each sample was measured by EBSD (about 5700 to 5800 crystal grains of each sample were evaluated, and an average value of the diameter of an approximating circle thereof was found). The average crystal grain sizes were between 4.1 μm to 4.3 μm.

TABLE 2

| | PULVERIZATION CONDITIONS | | |
|---|---|---|---|
| No. | MOISTURE SUPPLY (g/1 kg of powder) | AVERAGE GRAIN SIZE μm | SUPPLY RATE (kg/h) |
| 1 | 0 | 3.2 | 45.0 |
| 2 | 1.5 | 3.3 | 64.0 |
| 3 | 1.8 | 3.3 | 65.0 |
| 4 | 2.8 | 3.3 | 79.8 |
| 5 | 6.5 | 3.3 | 88.5 |
| 6 | 2.2 | 3.6 | 105.4 |
| 7 | 2.9 | 3.2 | 71.1 |
| 8 | 1.6 | 3.4 | 71.0 |
| 9 | 2.4 | 3.4 | 82.0 |
| 10 | 1.8 | 3.4 | 64.5 |
| 11 | 2.9 | 3.4 | 74.8 |
| 12 | 1.7 | 3.4 | 66.1 |
| 13 | 2.9 | 3.4 | 71.6 |

TABLE 3

| No. | O (ppm by mass) | $B_r$ (T) | $H_{cJ}$ (kA/m) | REMARKS |
|---|---|---|---|---|
| 1 | 885 | 1.44 | 1139 | COMPARATIVE EXAMPLE |
| 2 | 1488 | 1.45 | 1228 | PRESENT INVENTION EXAMPLE |
| 3 | 1738 | 1.44 | 1240 | PRESENT INVENTION EXAMPLE |
| 4 | 2075 | 1.44 | 1284 | PRESENT INVENTION EXAMPLE |
| 5 | 3700 | 1.40 | 1130 | COMPARATIVE EXAMPLE |
| 6 | 2367 | 1.45 | 1315 | PRESENT INVENTION EXAMPLE |

TABLE 1

(% by mass)

| | COMPOSITION OF SINTERED R-T-B BASED MAGNET | | | | | | | | | | | | | |
|---|---|---|---|---|---|---|---|---|---|---|---|---|---|---|
| No. | Nd | Pr | Dy | Co | B | Al | Cu | Ga | Zr | Fe | C | O | N | REMARKS |
| 1 | 24.44 | 5.56 | 0.00 | 0.45 | 0.92 | 0.11 | 0.30 | 0.52 | 0.05 | bal. | 1016 | 885 | 1028 | COMPARATIVE EXAMPLE |
| 2 | 24.42 | 5.56 | 0.00 | 0.45 | 0.92 | 0.10 | 0.29 | 0.52 | 0.05 | bal. | 882 | 1488 | 398 | PRESENT INVENTION EXAMPLE |
| 3 | 24.43 | 5.56 | 0.00 | 0.45 | 0.92 | 0.10 | 0.29 | 0.52 | 0.05 | bal. | 888 | 1738 | 411 | PRESENT INVENTION EXAMPLE |
| 4 | 24.44 | 5.55 | 0.00 | 0.45 | 0.92 | 0.10 | 0.29 | 0.52 | 0.05 | bal. | 901 | 2075 | 152 | PRESENT INVENTION EXAMPLE |
| 5 | 24.43 | 5.55 | 0.00 | 0.45 | 0.92 | 0.10 | 0.29 | 0.52 | 0.05 | bal. | 900 | 3700 | 120 | COMPARATIVE EXAMPLE |
| 6 | 24.00 | 5.40 | 0.02 | 0.45 | 0.92 | 0.10 | 0.29 | 0.52 | 0.05 | bal. | 952 | 2367 | 177 | PRESENT INVENTION EXAMPLE |
| 7 | 24.20 | 5.45 | 0.00 | 0.44 | 0.93 | 0.11 | 0.27 | 0.51 | 0.05 | bal. | 1033 | 2069 | 170 | PRESENT INVENTION EXAMPLE |
| 8 | 23.50 | 5.24 | 1.46 | 0.45 | 0.94 | 0.10 | 0.28 | 0.52 | 0.05 | bal. | 902 | 1402 | 445 | PRESENT INVENTION EXAMPLE |
| 9 | 23.55 | 5.27 | 1.50 | 0.45 | 0.94 | 0.10 | 0.28 | 0.52 | 0.05 | bal. | 874 | 1687 | 231 | PRESENT INVENTION EXAMPLE |
| 10 | 22.40 | 4.98 | 2.99 | 0.45 | 0.94 | 0.10 | 0.28 | 0.52 | 0.05 | bal. | 927 | 1569 | 454 | PRESENT INVENTION EXAMPLE |
| 11 | 22.40 | 4.99 | 3.03 | 0.45 | 0.94 | 0.10 | 0.28 | 0.52 | 0.05 | bal. | 893 | 1832 | 221 | PRESENT INVENTION EXAMPLE |
| 12 | 21.40 | 4.81 | 4.44 | 0.49 | 0.94 | 0.10 | 0.27 | 0.51 | 0.05 | bal. | 888 | 1392 | 471 | PRESENT INVENTION EXAMPLE |
| 13 | 21.30 | 4.75 | 4.54 | 0.45 | 0.94 | 0.09 | 0.27 | 0.51 | 0.05 | bal. | 890 | 1759 | 275 | PRESENT INVENTION EXAMPLE |

TABLE 3-continued

| No. | O (ppm by mass) | $B_r$ (T) | $H_{cJ}$ (kA/m) | REMARKS |
|---|---|---|---|---|
| 7 | 2069 | 1.44 | 1231 | PRESENT INVENTION EXAMPLE |
| 8 | 1402 | 1.42 | 1360 | PRESENT INVENTION EXAMPLE |
| 9 | 1687 | 1.42 | 1418 | PRESENT INVENTION EXAMPLE |
| 10 | 1569 | 1.38 | 1613 | PRESENT INVENTION EXAMPLE |
| 11 | 1832 | 1.37 | 1662 | PRESENT INVENTION EXAMPLE |
| 12 | 1392 | 1.33 | 1874 | PRESENT INVENTION EXAMPLE |
| 13 | 1759 | 1.33 | 1953 | PRESENT INVENTION EXAMPLE |

As shown in Table 1 and Table 2, Nos. 1 through 5 have approximately the same composition except for C, O and N, and have approximately the same average particle size of the fine-pulverized powder obtained as a result of the pulverization by the jet mill. As shown in Table 3, the present invention examples (Nos. 2 through 4) all have higher magnetic characteristics than those of No. 1 obtained as a result of the pulverization with no humidification.

Conventionally, it is considered that in the case where the composition and the particle size are approximately the same, the magnetic characteristics are deteriorated as the amount of oxygen is increased. However, as understood by a comparison of No. 1 against Nos. 2 through 4, as long as the oxygen content of the sintered R-T-B based magnet is within the range of the present disclosure, the magnetic characteristics are improved (the $H_{cJ}$ is improved) on the contrary. As understood by No. 5, even in the case where the pulverization is performed with humidification, the magnetic characteristics are deteriorated when the oxygen content of the sintered R-T-B based magnet is out of the range of the present disclosure. As shown in Table 2, in the case where the pulverization is performed such that the average particle size will be about 3.3 μm, the rate of supply is higher in the present invention examples than in the comparative example produced with no humidification (No. 1). Namely, the ease of pulverization is higher in the present invention examples. It is understood from the results shown in Table 2 and Table 3 that the oxygen content of the sintered R-T-B based magnet is preferably not lower than 1700 ppm in order to obtain higher ease of pulverization. As shown in Table 3, all the present invention examples have high magnetic characteristics as represented by $B_r \geq 1.33$ T and $H_{cJ} \geq 1200$ kA/m.

Example 2

The sintered bodies of Nos. 1 through 3 in example 1 were prepared. The sintered bodies were each subjected to the diffusion step of diffusing a heavy rare-earth element RH from the surface to the interior of the sintered body. Specifically, raw materials of each of the elements were weighed so as to obtain a composition of $Pr_{80}Tb_{10}Ga_7Cu_3$ by mass, and the raw materials were melted to obtain an alloy in a ribbon or flake form by a single roll rapid quenching method (melt spinning method). The resultant alloy was pulverized in an argon atmosphere, and then was passed through a sieve with an opening of 425 μm to prepare a diffused alloy powder. The sintered bodies of Nos. 1 through 3 in Table 1 were each cut and ground to obtain a cube having a size of 7.2 mm×7.2 mm×7.2 mm. Next, the diffused alloy was spread onto the entire surface of each of the sintered bodies of Nos. 1 through 3 at a rate of 2.5% by mass with respect to 100% by mass of the sintered R-T-B based magnet. Then, the obtained sintered bodies were heat-treated at 900° C. for 10 hours in argon at a reduced pressure controlled to be 50 Pa, then cooled down to room temperature, and then heat-treated at 500° C. for 3 hours in argon at a reduced pressure controlled to be 50 Pa to produce post-diffusion sintered R-T-B based magnets (Nos. 20 through 22).

The magnetic characteristics of the obtained post-diffusion sintered R-T-B based magnets were measured in substantially the same manner as in example 1. The results are shown in Table 4. In Table 4, $\Delta H_{cJ}$ refers to the value of Hou increased by the diffusion. In Table 4, $\Delta H_{cJ}$ of No. 20 is the value obtained by subtracting the value of $H_{cJ}$ of the pre-diffusion magnet No. 1 (1139 kA/m) from the value of $H_{cJ}$ of the post-diffusion magnet (1826 kA/m). The value of $\Delta H_{cJ}$ is calculated in the same manner for the other two samples. A line analysis was performed by Energy Dispersive X-ray Spectroscopy (EDX) on a cross-section of each sintered R-T-B based magnet, specifically, on a region from the surface to the vicinity of the center of the cross-section. As a result, the sintered R-T-B based magnet was confirmed to include a portion where the Tb concentration was gradually decreased from the surface to the interior of the magnet.

TABLE 4

| No. | PRE-DIFFUSION MAGNET No. | $B_r$ (T) | $H_{cJ}$ (kA/m) | $\Delta H_{cJ}$ | REMARKS |
|---|---|---|---|---|---|
| 20 | 1 | 1.44 | 1826 | 687 | COMPARATIVE EXAMPLE |
| 21 | 2 | 1.43 | 1940 | 711 | PRESENT INVENTION EXAMPLE |
| 22 | 3 | 1.43 | 1940 | 700 | PRESENT INVENTION EXAMPLE |

As shown in Table 4, the present invention examples (Nos. 21 and 22), each obtained after the diffusion step was performed on the sintered body subjected to pulverization with humidification according to the present disclosure, exhibit higher $\Delta H_{cJ}$ than that of the comparative example (No. 20) obtained after the diffusion step was performed on the sintered body subjected to pulverization with no humidification.

The ease of pressing was checked on the fine-pulverized powder prepared under the conditions of each of Nos. 1 through 4, 6 and 7 in Table 1. The results are shown in Table 5. In Table 5, the "pressing pressure" refers to the pressure of pressing when the density of the compact reaches 4.1 g/cm$^3$ (ρg=4.1 g/cm$^3$). Table 5 shows that as the pressing pressure is lower, the compressibility is higher and the ease of pressing is higher.

TABLE 5

| No. | O (ppm by mass) | PRESSING PRESSURE (kgf/cm$^2$) | REMARKS |
|---|---|---|---|
| 1 | 885 | 0.25 | COMPARATIVE EXAMPLE |
| 2 | 1488 | 0.15 | PRESENT INVENTION EXAMPLE |
| 3 | 1738 | 0.16 | PRESENT INVENTION EXAMPLE |
| 4 | 2075 | 0.10 | PRESENT INVENTION EXAMPLE |
| 6 | 2367 | 0.11 | PRESENT INVENTION EXAMPLE |
| 7 | 2069 | 0.07 | PRESENT INVENTION EXAMPLE |

As shown in Table 5, the present invention examples all have a lower pressing pressure and higher compressibility than the comparative example. It was possible to press the present invention examples at a pressing pressure not higher than 0.20 kgf/cm$^2$. Especially, Nos. 4 through 7 each have significantly higher compressibility as indicated by the results that the pressing pressure is not higher than half of that of comparative example. It was possible to press Nos. 4 through 7 at a pressing pressure not higher than 0.15 kgf/cm$^3$. As can be seen, the oxygen content of the sintered R-T-B based magnet is preferably not lower than 2000 ppm by mass. In consideration of the magnetic characteristics ($B_r$ and $H_{cJ}$) shown in Table 3, the oxygen content of the sintered R-T-B based magnet is preferably not lower than 2000 ppm by mass and not higher than 2400 ppm by mass.

obtained sintered R-T-B based magnet were found in substantially the same manner as in example 1. The units of the contents of O, C and N are ppm by mass. The results are shown in Table 6. As shown in Table 6, samples Nos. 23 and 24 have approximately the same composition except for O, C and N. Similarly, samples Nos. 25 and 26 have approximately the same composition except for O, C and N.

Table 8 shows results of the measurement of the magnetic characteristics of the obtained sintered R-T-B based magnets. In Table 8, "23° C., $B_r$, $H_{cJ}$" refers to the values of $B_r$, $H_{cJ}$ at room temperature (23° C.). "140° C., $H_{cJ}$" refers to the value of Hou at 140° C. These values of $B_r$ and $H_{cJ}$ were measured as follows: the post-heat-treatment sintered R-T-B based magnets were mechanically processed into cubes each having a size of 7 mm×7 mm×7 mm, and these values of the cubes were measured by a B-H tracer. In addition, the temperature coefficient (β: 23 to 140° C.) was found as follows: where the value of $H_{cJ}$ at 140° C. is $H_{cJ140}$ and the value of $H_{cJ}$ at 23° C. is $H_{cJ23}$, the temperature coefficient=$(H_{cJ140}-H_{cJ23})/H_{cJ23}/(140°\ C.-23°\ C.)\times 100$. This indicates that as the absolute value of the temperature coefficient is smaller, the temperature coefficient is improved more. As shown in Table 8, the present invention examples each have a value of $B_r$ that is not lower than 1.391 T, a value of $H_{cJ}$ that is not lower than 1190 kA/m, and a value of β that is not higher than −0.578. As can be seen from a comparison between No. 23 and No. 24 having approximately the same composition, and a comparison between No. 25 and No. 26 having approximately the same composition, the present invention examples each have an improved temperature coefficient.

TABLE E (% by mass)

| No. | COMPOSITON OF SINTERED R-T-B BASED MAGNET Nd | Pr | Co | B | Al | Cu | Ga | Zr | Fe | C | O | N | REMARKS |
|---|---|---|---|---|---|---|---|---|---|---|---|---|---|
| 23 | 22.6 | 7.39 | 0.88 | 0.96 | 0.08 | 0.14 | 0.53 | 0.10 | bal. | 950 | 980 | 630 | COMPARATIVE EXAMPLE |
| 24 | 22.6 | 7.28 | 0.87 | 0.96 | 0.07 | 0.13 | 0.52 | 0.10 | bal. | 915 | 1670 | 105 | PRESENT INVENTION EXAMPLE |
| 25 | 22.6 | 7.41 | 0.88 | 0.88 | 0.09 | 0.14 | 0.52 | 0.10 | bal. | 1040 | 990 | 610 | COMPARATIVE EXAMPLE |
| 26 | 22.8 | 7.41 | 0.87 | 0.88 | 0.09 | 0.14 | 0.53 | 0.10 | bal. | 1020 | 1845 | 190 | PRESENT INVENTION EXAMPLE |

Example 3

Alloys for sintered R-T-B based magnets were formed such that the sintered R-T-B based magnets would have the compositions shown in samples Nos. 23 through 26 in Table 6 in substantially the same manner as in example 1. The obtained alloys were each coarse-pulverized in substantially the same manner as in example 1 to obtain a coarse-pulverized powder. The obtained coarse-pulverized powder was pulverized in substantially the same manner as in example 1 to obtain a fine-pulverized powder. Conditions for the pulverization are shown in Table 7. The obtained fine-pulverized powder was pressed, sintered and heat-treated in substantially the same manner as in example 1 to obtain a sintered R-T-B based magnet. Components of the

TABLE 7

| No. | PULVERIZATION CONDITIONS MOISTURE SUPPLYm (g/1 kg of powder) | AVERAGE GRAIN SIZE (μm) | SUPPLY RATE (kg/h) |
|---|---|---|---|
| 23 | 0 | 3.6 | 50.0 |
| 24 | 0.8 | 3.6 | 63.0 |
| 25 | 0 | 3.6 | 50.0 |
| 26 | 0.9 | 3.6 | 63.0 |

TABLE 8

| No. | O (% by mass) (ppm) | 23° C. $B_r$ (T) | 23° C. $H_{cJ}$ (kA/m) | 140° C. $H_{cJ}$ (kA/m) | β (%/° C.) | REMARKS |
|---|---|---|---|---|---|---|
| 23 | 980 | 1.416 | 1160 | 342 | −0.600 | COMPARATIVE EXAMPLE |
| 24 | 1670 | 1.431 | 1190 | 382 | −0.578 | PRESENT INVENTION EXAMPLE |
| 25 | 990 | 1.391 | 1583 | 548 | −0.557 | COMPARATIVE EXAMPLE |
| 26 | 1845 | 1.395 | 1572 | 556 | −0.550 | PRESENT INVENTION EXAMPLE |

Example 4

Alloys for sintered R-T-B based magnets were formed such that the sintered R-T-B based magnets would have the compositions shown in samples Nos. 27 and 28 in Table 9 in substantially the same manner as in example 1. The obtained alloys were each coarse-pulverized in substantially the same manner as in example 1 to obtain a coarse-pulverized powder. The obtained coarse-pulverized powder was pulverized in substantially the same manner as in example 1 to obtain a fine-pulverized powder. Conditions for the pulverization are shown in Table 10. The obtained fine-pulverized powder was pressed, sintered and heat-treated in substantially the same manner as in example 1 to obtain a sintered R-T-B based magnet. Components of the obtained sintered R-T-B based magnet were found in substantially the same manner as in example 1. The results are shown in Table 9.

As shown in Table 9, samples Nos. 27 and 28 have approximately the same composition except for O, C and N. The units of the contents of O, C and N are ppm by mass. Table 11 shows results of the measurement of the magnetic characteristics of the obtained sintered R-T-B based magnets. As shown in Table 11, a comparison between No. 27 and 28 having approximately the same composition indicates that the present invention example (No. 28) has higher magnetic characteristics.

TABLE 11

| No. | $B_r$ (T) | $H_{cJ}$ (kA/m) | REMARKS |
|---|---|---|---|
| 27 | 1.429 | 1122 | COMPARATIVE EXAMPLE |
| 28 | 1.430 | 1176 | PRESENT INVENTION EXAMPLE |

The boundary phase of the sintered R-T-B based magnet of each of Nos. 27 and 28 was observed.

Specifically, electron diffraction was performed to identify the crystal structure of the oxide phase. As a result, the crystal structure of each of Nos. 27 and 28 was found to include an NaCl-type oxide phase. Next, a point analysis and mapping by EDX and WDX were performed. An analysis by EDX was performed on Fe and Nd. An analysis by WDX was performed on Pr, C, N and O. A point analysis was performed on three points of the oxide phase of each of the samples. The average of the results is shown in Table 12. Regarding "(A)" in Table 12, where the O content (% by atom) of the rare-earth oxide nitride phase is represented by {O}, and the N content (% by atom) of the rare-earth oxide nitride phase is represented by {N}, "GOOD" indicates that the relationship of {O}>1.8×{N} is satisfied and "NO GOOD" indicates that this relationship is not satisfied.

TABLE 9

(% by mass)

| No. | Nd | Pr | Co | B | Al | Cu | Ga | Zr | Fe | C | O | N | REMARKS |
|---|---|---|---|---|---|---|---|---|---|---|---|---|---|
| | COMPOSITION OF SINTERED R-T-B BASED MAGNET | | | | | | | | | | | | |
| 27 | 24.6 | 5.7 | 0.47 | 0.94 | 0.13 | 0.35 | 0.47 | 0.05 | bal | 1016 | 885 | 1028 | COMPARATIVE EXAMPLE |
| 28 | 24.5 | 5.6 | 0.47 | 0.94 | 0.13 | 0.35 | 0.47 | 0.05 | bal | 882 | 1488 | 398 | PRESENT INVENTION EXAMPLE |

TABLE 10

| No. | PULVERIZATION CONDITIONS MOSTURE SUPPLY (g/1 kg of powder) | AVERAGE GRAIN SIZE (μm) | SUPPLY RATE (kg/h) |
|---|---|---|---|
| 27 | 0 | 3.2 | 52.0 |
| 28 | 0.6 | 3.3 | 64.0 |

Similarly, regarding "(B)", "GOOD" indicates that the relationship of {C}>{N}×0.5 is satisfied, and "NO GOOD" indicates that this relationship is not satisfied.

Based on results of the mapping, the ratio of the rare-earth oxide nitride phase according to the present disclosure was calculated. First, the mapping intensity of each of the elements was converted into the concentration so as to match the results of the point analysis by use of software produced by JEOL, Ltd., "NMap". Next, software produced by JEOL, Ltd., "Phase Map Maker", was used to analyze the scatter plot. Specifically, a region of {O}≥10% by atom was colored, as a region of the oxide phase, with a different color from the rest of the diagram. Then, regions satisfying (A) and (B) were colored with different colors. In this manner, the rare-earth oxide nitride phase according to the present disclosure was distinguished from the rest of the oxide phase. The number of pixels of each color of the obtained image was counted, and thus the size of the cross-sectional area, of the rare-earth oxide nitride phase according to the present disclosure, occupying the rare-earth oxide phase was calculated.

As shown in Table 12, in the case of the present invention example (No. 28), the ratio of the area size of the rare-earth oxide nitride phase according to the present disclosure with respect to the area size of the rare-earth oxide phase is 70%. In addition, the present invention example (No. 28) satisfies (A) and (B). By contrast, in the case of the comparative example, the ratio of the area size of the rare-earth oxide nitride phase proposed by the present disclosure is 14%. The comparative example does not satisfy (A) or (B).

TABLE 12

| | POINT ANALYSIS RESULTS (AVERAGE OF 3 POINTS, % BY ATOM) | | | | | | | | CROSS-SECTIONAL AREA OF RARE-EARTH OXIDE NITRIDE PHASE OF PRESENT DISCLOSURE | |
|---|---|---|---|---|---|---|---|---|---|---|
| No. | Fe | Nd | Pr | C | N | O | (A) | (B) | (%) | |
| 27 | 5.8 | 36.1 | 8.3 | 4.3 | 29.3 | 16.2 | NO GOOD | NO GOOD | 14 | COMPARATIVE EXAMPLE |
| 28 | 3.5 | 37.8 | 9.9 | 10.7 | 11.4 | 26.7 | GOOD | GOOD | 70 | PRESENT INVENTION EXAMPLE |

Example 5

The sintered bodies of samples Nos. 27 and 28 were each subjected to the diffusion step of diffusing a heavy rare-earth element RH from the surface to the interior of the sintered body. Specifically, raw materials of each of the elements were weighed so as to obtain a composition of $Nd_{31}Pr_{50}Tb_9Ga_5Cu_5$ by mass, and the raw materials were melted. An atomizing method was used to prepare a diffused alloy powder. The sintered bodies of Nos. 27 and 28 in Table 9 were each cut and ground to obtain a cuboid having a size of 7.2 mm×7.2 mm×4.7 mm (the magnetic field would be applied in the direction of the length of 4.7 mm at the time of pressing). Next, the diffused alloy was spread onto one surface (the surface of 7.2 mm×7.2 mm) of each of the sintered bodies of Nos. 27 and 28 at a rate of 2% by mass with respect to 100% by mass of the sintered R-T-B based magnet. Then, the obtained sintered bodies were heat-treated at 920° C. for 10 hours in argon at a reduced pressure controlled to be 50 Pa, then cooled down to room temperature, and then heat-treated at 450° C. for 3 hours in argon at a reduced pressure controlled to be 50 Pa to produce post-diffusion sintered R-T-B based magnets (Nos. 29 and 30). The post-diffusion sintered R-T-B based magnets were each confirmed to include a portion where the Tb concentration was gradually decreased from the surface to the interior of the magnet by substantially the same manner as in example 2.

The magnetic characteristics of the obtained post-diffusion sintered R-T-B based magnets (Nos. 29 and 30) were measured in substantially the same manner as in example 1. The results are shown in Table 13. In Table 13, $\Delta H_{cJ}$ refers to the value of Hou increased by the diffusion.

TABLE 13

| No. | PRE-DIFFUSION MAGNET No. | $B_r$ (T) | $H_{cJ}$ (kA/m) | $\Delta H_{cJ}$ | REMARKS |
|---|---|---|---|---|---|
| 29 | 27 | 1.422 | 1445 | 322 | COMPARATIVE EXAMPLE |
| 30 | 28 | 1.414 | 1790 | 613 | PRESENT INVENTION EXAMPLE |

As shown in Table 13, the post-diffusion present invention example (No. 30) exhibits a higher value of $\Delta H_{cJ}$ than that of the post-diffusion comparative example (No. 29). An observation was made in substantially the same manner as in example 4 to find out whether the boundary phase of each of the post-diffusion sintered R-T-B based magnets included a rare-earth oxide nitride phase proposed by the present disclosure. It was confirmed that the compositions and the ratios of the area sizes of the NaCl-type rare-earth oxide nitride phases of the post-diffusion sintered R-T-B based magnets of Nos. 29 and 30 were approximately the same as those of Table 12 (pre-diffusion sintered R-T-B based magnets) respectively.

INDUSTRIAL APPLICABILITY

A method for producing a sintered R-T-B based magnet according to the present disclosure is applicable as a permanent magnet usable for various uses including various types of motors such as voice coil motors (VCM) of hard disc drives, motors for electric vehicles (EV, HV, PHV, etc.) and motors for industrial equipment, home appliance products, and the like.

REFERENCE SIGNS LIST

100 jet mill machine; 200 . . . cyclone collection device, 300 . . . bag filter device

The invention claimed is:

1. A method for producing a sintered R-T-B based magnet, R is a rare-earth element and contains at least one selected from the group consisting of Nd, Pr and Ce with no exception, and T is at least one transition metal and contains Fe with no exception, the method comprising the steps of:

preparing a coarse-pulverized powder of an alloy for the sintered R-T-B based magnet, the coarse-pulverized powder having an average particle size not shorter than 10 μm and not longer than 500 μm;

supplying the coarse-pulverized powder to a jet mill machine including a pulverization chamber filled with inert gas and pulverizing the coarse-pulverized powder to obtain a fine-pulverized powder having an average particle size not shorter than 2.0 μm and not longer than 4.5 μm; and forming a sintered body of the fine-pulverized powder, wherein the inert gas is supplied with moisture at a rate of not lower than 0.5 g and not higher than 6.0 g per 1 kg of the coarse-pulverized powder, and the sintered R-T-B based magnet contains oxygen at a content not lower than 1000 ppm by mass and not higher than 3500 ppm by mass.

2. The method for producing a sintered R-T-B based magnet of claim 1, wherein the sintered R-T-B based magnet contains R at a content not higher than 31% by mass.

3. The method for producing the sintered R-T-B based magnet of claim 2, wherein, the content of R is measured by Inductively Coupled Plasma Optical Emission Spectroscopy.

4. The method for producing a sintered R-T-B based magnet of claim 1, wherein the inert gas is nitrogen gas.

5. The method for producing a sintered R-T-B based magnet of claim 1, further comprising a diffusion step of diffusing a heavy rare-earth element RH, RH is at least one of Tb, Dy and Ho, from a surface to an interior of the sintered body.

6. The method for producing a sintered R-T-B based magnet of claim 1, wherein the step of forming the sintered body of the fine-pulverized powder includes the steps of:

forming a powder compact of the fine-pulverized powder by magnetic field wet press, or magnetic field press in an inert gas atmosphere, and sintering the powder compact.

7. The method for producing a sintered R-T-B based magnet of claim 1, wherein in the step performed to obtain the fine-pulverized powder, the fine-pulverized powder has an average particle size not shorter than 2.0 μm and not longer than 3.5 μm.

8. The method for producing the sintered R-T-B based magnet of claim 1, wherein a dew point of the inert gas is in a range that is not lower than −55° C. and not higher than −30° C.

9. The method for producing the sintered R-T-B based magnet of claim 1, wherein the average particle size of the coarse-pulverized powder and the average particle size of the fine-pulverized powder are each measured by an airflow-dispersion laser diffraction method conformed to JIS Z 8825:2013 revised edition, under conditions of a dispersion pressure of 4 bar, a measurement range of R2, and a calculation mode of HRLD.

10. The method for producing the sintered R-T-B based magnet of claim 1, wherein amounts of oxygen, nitrogen, and carbon are measured by use of a gas analyzer, respectively by a gas fusion-infrared absorption method, a gas fusion-infrared absorption method, and a combustion-infrared absorption method.

* * * * *